(12) United States Patent
Stolz

(10) Patent No.: US 6,708,275 B1
(45) Date of Patent: *Mar. 16, 2004

(54) PROCESS AND DEVICE FOR TRANSMITTING CONFIDENTIAL CONNECTION ESTABLISHMENT AND SERVICE INFORMATION BETWEEN SUBSCRIBER TERMINALS AND ONE OR MORE DIGITAL EXCHANGES

(75) Inventor: Helmut Stolz, Siegen (DE)

(73) Assignee: Deutsche Telekom, Bonn (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/973,927

(22) PCT Filed: Jun. 8, 1996

(86) PCT No.: PCT/DE96/01068
§ 371 (c)(1),
(2), (4) Date: Jun. 2, 1998

(87) PCT Pub. No.: WO96/42182
PCT Pub. Date: Dec. 27, 1996

(30) Foreign Application Priority Data

Jun. 13, 1995 (DE) .......................................... 195 21 485

(51) Int. Cl.[7] ................................................ G06F 11/30
(52) U.S. Cl. ........................................ 713/200; 713/201
(58) Field of Search ............................. 380/49, 25, 23, 380/21, 257; 713/200, 201, 168, 150; 709/200, 227

(56) References Cited

U.S. PATENT DOCUMENTS 5,115,466 A * 5/1992 Presttun ...................... 380/257
5,172,414 A   12/1992 Reeds, III et al.
5,546,463 A * 8/1996 Caputo et al. ................. 380/25

FOREIGN PATENT DOCUMENTS

| DE | 39 05 667 A1 | 8/1990 |
| DE | 41 20 398 A1 | 1/1993 |
| DE | 94 17 399 U1 | 4/1995 |
| DE | 44 06 590 A1 | 9/1995 |
| DE | 44 06 602 A1 | 9/1995 |
| EP | 0 618 713 A2 | 10/1994 |
| WO | WO 93/21711 | 10/1993 |
| WO | WO 95/15634 | 6/1995 |
| WO | 96/42182 | 12/1996 |

OTHER PUBLICATIONS

B. O'Higgins et al., "Innovations in Switching Technology," IEEE Communications Society and the IEEE Phoenix Section, Mar. 1987, pp. 0863–0869.

Carl Pomerance, "Integrating Cryptography in ISDN," Advances in Cryptography—CRYPTO '87, pp. 9–18.

Gasser et al., "The Digital Distributed System Security Architeecture," Proc. 12th Nat. Computer Security Conf., 1989, pp. 305–319.

W. Ford, et al., "Public–Key Cryptography and Open Systems Interconnection," IEEE Communications Magazine, Jul. 1992, pp. 30–35.

(List continued on next page.)

*Primary Examiner*—Ayaz Sheikh
*Assistant Examiner*—Hosuk Song
(74) *Attorney, Agent, or Firm*—Kenyon & Kenyon

(57) ABSTRACT

A process and a device which are characterized in that at least one first security device is arranged at one subscriber, that at least one second security device is arranged in the exchange, or alternatively, an additional device with at least one second security device is connected upstream from each exchange, the first and the second security devices being able to encode and/or decode and exchange with each other connection establishment and/or service information of the subscriber.

17 Claims, 2 Drawing Sheets

OTHER PUBLICATIONS

B. O'Higgins et al., "Secure Communications," Telesis 1989, No. 2, pp. 42–50.

R. Benjamin, "Security Considerations in Communications Systems and Networks," IEE Proceedings, vol. 137, Pt. 1, No. 2, Apr. 1990, pp. 61–72.

Matthias Leclerc, et al., "Sichere Kommunikationsnetze und deren Protokolle," Informationstechnik it 32 (1990) 1, pp. 33–45.

Von Gerhard Lehnert, et al., "Unternehmensbedrohung durch ISDN?," Funkschau 25/1990, pp. 70–74.

Kare Presttun, "Integrating Cryptography in ISDN" siehe das ganze documnets, pp. 9–18, Jan. 1987.*

* cited by examiner

PROCESS AND DEVICE FOR TRANSMITTING CONFIDENTIAL CONNECTION ESTABLISHMENT AND SERVICE INFORMATION BETWEEN SUBSCRIBER TERMINALS AND ONE OR MORE DIGITAL EXCHANGES

FIELD OF THE INVENTION

The present invention concerns a process for the transmission of confidential and authentic connection establishment and/or service information between subscriber-side terminals and one or more digital exchanges of a digital communication network, in particular an ISDN network, as well as a device for the transmission of confidential connection establishment and service information.

RELATED TECHNOLOGY

Digital telecommunication networks are known that feature a plurality of subscriber connections and digital exchanges. Since a subscriber connection transmits all dialing and service information unencoded, i.e., as plain text to a digital exchange, intruders or eavesdroppers can simply tap into this confidential information on the subscriber lines by cutting into existing communication paths or intruding into the existing lines at different points. An intruder, once having obtained said dialing and service information, can use the exchange at the expense of the subscriber, even without being authorized to do so.

In the article "INTEGRATING CRYPTOGRAPHY IN ISDN," published in "ADVANCES IN CRYPTOLOGY", Santa Barbara, Aug. 16–20, 1987, Conf. No. 7, Jan. 1, 1987, Pomerance C., pp. 9–18, XP000130200, K. Presttun discloses a cryptographically secured ISDN communication system with a plurality of data terminals connected to the ISDN via a network terminator, as well as with a plurality of exchanges associated with an authentication service device. A security module, used only for coding and decoding useful data transmitted over the B channel of an ISDN connection, is implemented in each data terminal or network terminator. The D channel of the ISDN connection is used to distribute security keys among the data terminals and to manage security. Coding of connection establishment and service information is not disclosed in that document.

SUMMARY OF THE INVENTION

Therefore, the object of the invention is to make misuse of the exchange by unauthorized intruders at the expense of authorized subscriber connection owners difficult or even impossible.

This object is achieved by the invention through the steps of process claim 1 and the features of device claims 6 and 8.

The invention is implemented in a digital communication network, in particular an ISDN. Such a digital communication network includes, as is known, a plurality of exchanges, at least one network terminator installed at the subscriber, to which at least one data terminal, such as telephone sets, personal computers, or fax machines, can be connected. Undesired use by an intruder is prevented by providing at least one first security device at a subscriber connection owner; in addition, at least one second security device is provided in at least one exchange, with the first and second security devices assigned to a specific subscriber being capable of encoding and/or decoding and exchanging, via a separate control channel of the digital communication network, connection establishment and/or service information. Each of said security devices has a security module capable of receiving an identification carrier.

Connection-specific assemblies, each containing a second security device, are installed at each exchange. This embodiment is, however, expensive and complex, since the exchanges themselves must be rebuilt.

A more cost-effective method, which can be implemented in a simpler manner, comprises of installing an additional device, based on the existing digital exchanges, between the network terminators assigned to the exchange and the exchange. The respective second security device for each subscriber connection is installed in this additional device.

The first security device of a given connection owner is advantageously arranged in the network terminator itself corresponding to each subscriber connection. In this case a single security device is sufficient even if the owner of a subscriber line can connect up to eight data terminals to the network termination via an $S_0$ bus. It is perfectly possible to equip each data terminal of a given network termination with its own security device. Another alternative may consist of connecting a security device between each data terminal and its network terminator. It can be easily seen, however, that both of the latter implementation options are complex and costly, since each data terminal requires its own security device. The service information may include call forwarding and conferencing functions, for example. If the digital communication network is an ISDN, the transmission of confidential information between the subscriber-side first security device and the respective second security device in the exchange takes place via the D channel of the ISDN network. Each identification carrier can then store an individual cryptographic key that is specific to a given subscriber connection owner. The identification carrier may be a smart card that can be inserted by the owner of a subscriber connection in the first security device and by an employee of the network operator in the second security device. An advantageous alternative provides a software module as the identification carrier, which can be installed exchangeably in the respective security device. In an advantageous refinement, the identification carrier is a software module, which can be exchangeably installed in the respective security module. In an advantageous refinement, the first, subscriber-side, security device and the second security device of the exchange can perform subscriber authentication to the exchange. Alternatively, separate authentication devices can be installed for this function.

Protection for the exchange and the authorized subscriber connection owner can be enhanced by having the first and second security devices, assigned to a given subscriber, encode and decode, respectively, a user-to-user communication to be transmitted via the control channel of the digital communication network.

The subscriber-side security device of a given subscriber and the security device of the exchange preferably have the same subscriber-specific ID. In addition, they encode and decode the confidential information with the same subscriber-specific key.

BRIEF DESCRIPTION OF THE DRAWINGS

The present invention is explained below with reference to the embodiments illustrated in the following figures, in which.

DETAILED DESCRIPTION

Figure 1:
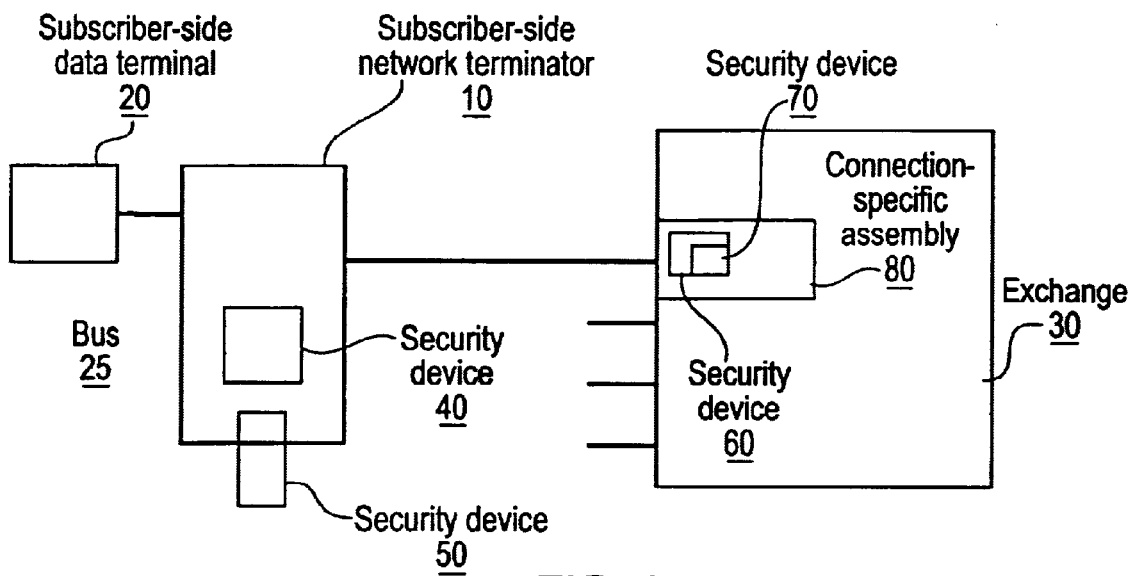
FIG. 1 schematically shows a section of a digital communication network shown as a communication path from a telephone set to a digital exchange where the present invention is implemented.

FIG. 1 shows in a simplified form a part of a digital communication network, exemplified in the description that follows as an ISDN network. A telephone set 20 is illustrated as a data terminal on the subscriber side, which is connected to a network terminator 10 via an $S_0$ bus 25. Network terminator 10, also referred to as Net Terminator (NT), can be installed in the building or room of a subscriber connection owner. Up to eight data terminals, such as other telephone sets 20, fax machines, or personal computers, can be connected to $S_0$ bus 25. In the example illustrated, a subscriber-side security device 40, 50 according to this invention is built into network terminator 10. The safety device includes a subscriber-specific identification carrier 50 and a safety module 40, which can be permanently installed in network terminator 10 where an identification carrier 50 can be inserted. Identification carrier 50 can be a smart card or a software module. Security device 40 and identification carrier 50 are designed so that they can encode or decode confidential connection establishment or service information with a subscriber-specific or connection-specific key. This key can be stored in a storage module of the smart card of the connection owner. The output of network terminator 10 is connected to a corresponding ISDN exchange 30 via a twisted two-wire cable in a known manner. Of course, an ISDN network includes a plurality of network terminators 10 and a plurality of exchange systems 30, which may be interconnected via twisted two-wire cables. As a possible alternative, conventional two-wire cables can be supplemented and replaced by fiber-optic cables, for example. Exchange 30 includes a plurality of assemblies 80 (FIG. 1 only illustrates a single connection-specific assembly 80), each assigned to certain subscriber connection owners. In the first embodiment according to this invention, a security device 60, 70 is arranged in each connection-specific assembly 80. Like the subscriber-specific security device 40, 50, security device 60, 70 in exchange 30 includes a module 60, which can be permanently installed in assembly 80 and an identification carrier 70, which can be inserted therein. It is assumed that identification carrier 70 in exchange 30 also contains the individual cryptographic key of subscriber-side security device 40, 50.

Figure 2:
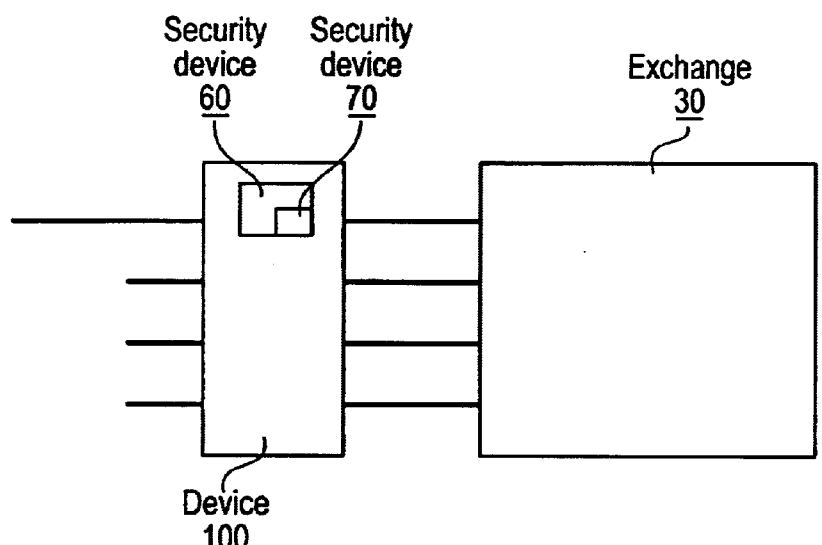
FIG. 2 shows one embodiment where the security device according to present invention is installed in an additional device on the exchange side.

FIG. 2 shows an alternative embodiment where additional device 100 is connected between network terminator 10 and exchange 30. For greater clarity, FIG. 2 shows additional device 100 only with the built-in security device 60, 70. Normally all security devices 60, 70 of subscribers or network terminators jointly served by exchange 30 are installed in additional device 100. The corresponding subscriber lines are indicated in FIGS. 1 and 2. Again, identification carriers 70 can be inserted as smart cards from the outside by an operator or, in the implementation as a software module, can be installed in the respective security module 60. The use of additional device 100 has the advantage that existing ISDN network exchanges can continue to be used without time-consuming, costly, and complex modifications of the exchange system for the encoded transmission of confidential information, for example, of the subscriber of telephone set 20 to exchange 30.

Figure 5:
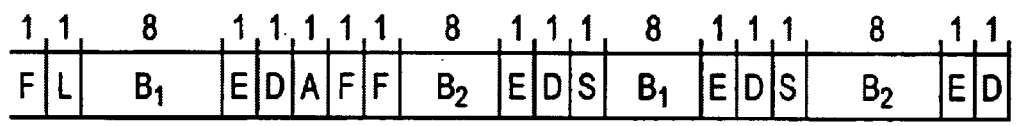
FIG. 5 shows the frame format of the ISDN bit streams.
Figure 3:
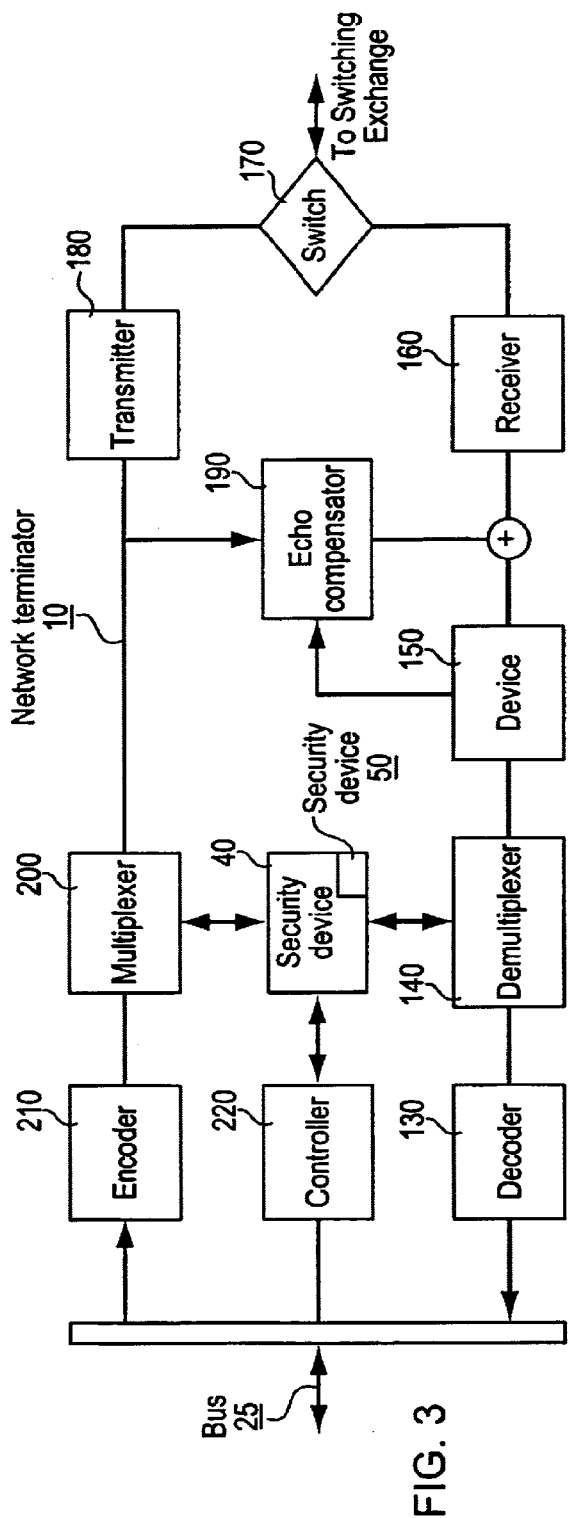
FIG. 3 shows a detailed block diagram of the network terminator with the security device according to the present invention.

FIG. 3 shows a simplified block diagram of the known network terminator 10, where the security module 40 according to this invention, together with identification carrier 50, are installed. On the subscriber side, network terminator 10 has a connection unit for $S_0$ bus 25, to which up to eight data terminals 20 can be connected. Since the structure and the mode of operation of network terminator 10 are generally known, only the essential components are briefly explained below. Basically network terminator 10 has a send path and a receive path. The send path includes an encoder 210, which, among other things, supplies the confidential information to be transmitted in the D channel of the ISDN network to an encoder in security device 40, 50, and a multiplexer 200, which combines the two B channels and the D channel to a continuous data stream in a time multiplexing operation. A suitable frame format consists of 48 bits per 250 ms, with only four D channel bits provided per frame. In other words, 16 kbits/sec are transmitted over the D channel (see FIG. 5). The send path then goes to a hook switch 170 via a transmitter 180; said hook switch sends the outgoing data stream to a two-wire cable that connects exchange 30 to network terminator 10. Incoming data streams go through hook switch 170, a receiver 160, and a device 150, which equalizes and amplifies the data stream received and recovers the clock signal from it. Then the data stream passes through a demultiplexer 140, which decomposes the data stream again into the two B channels and the D channel. The demultiplexed data stream passes through decoder 130 and is then transmitted, according to a destination address, to telephone set 20, for example, via the $S_0$ bus 25. An echo compensation 190, connected in parallel between transmitter 180 and receiver 160, is used, among other things, for compensating outgoing messages sent to the receive path through hook switch 170 and receiver 160. The heart of network terminator 10 is a controller 220, which controls the management and mutual control of the individual components. The security module 40 according to this invention with the inserted identification carrier 50 is connected, for example, to controller 220, encoder 210, multiplexer 200, demultiplexer 140, and decoder 130. Controller 220 is also responsible for activating or deactivating security device 40, 50 as required by the situation.

Figure 4:
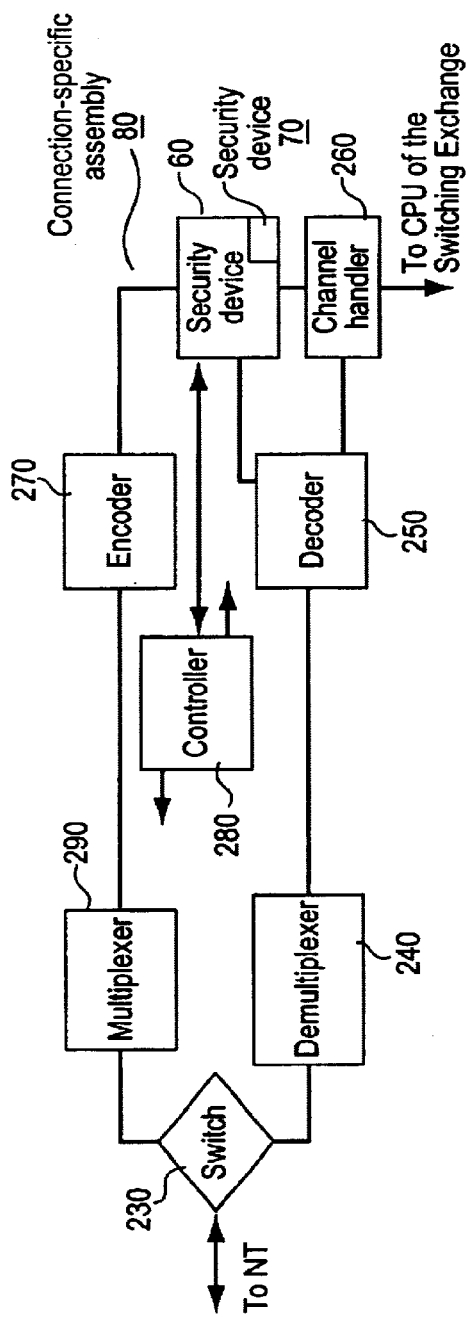
FIG. 4 shows a detailed block diagram of a connection-specific assembly in the exchange with a built-in security module.

FIG. 4 shows an example of a block diagram of a subscriber-specific assembly 80, installed in exchange 30. The connection-specific assembly 80 basically forms the counterpart of network terminator 10. Incoming data messages go, via the two-wire line, to a hook switch 230 and then pass through a demultiplexer 240, a decoder 250, and a D channel handler 260. D channel handler 260 supplies control information to a central controller of exchange 30. In the opposite direction, outgoing messages pass through an encoder 270, a multiplexer 290, and a hook switch 230 on the two-wire line to network terminator 10. Also in connection-specific assembly 80, a controller 280 is responsible for the management of and interaction between the individual components. Security module 60 is installed in connection-specific assembly 80, according to this invention, with a smart card that can be inserted from the outside, or an installed software module 70. Security device 60, 70, which includes security module 60 and identification carrier 70, is connected to encoder 270, decoder 250, D channel handler 260, and controller 280. As mentioned previously, authentication device 60, 70 can also be advantageously installed in additional device 110, as shown in FIG. 2.

It is convenient to install security device 40, 50 in network terminator 10 itself, since in this way only one security device 40, 50 is required, regardless of the number of data terminals 20 connected. However, it is also conceivable to arrange the subscriber-side security device 40, 50 in each data terminal 20. Another alternative consists of providing a security device (not illustrated) between network terminator 10 and each connected data terminal 20. For reasons of economics, it is convenient to install security devices 40, 50 in network terminator 10 itself, shown in FIG. 1. Then identification carrier 50 can be installed in the form of a software module by the network operator when network terminator 10 is installed at the subscriber. If identification carrier 50 is a smart card, the subscriber can purchase this card, containing the subscriber's individual subscriber key, from the network operator.

The transmission of confidential connection establishment and/or service information between telephone set 20 and exchange 30 is now described in detail.

It is assumed that one subscriber-side security device 40, 50 is installed in network terminator 10 and a second security device 60, 70 is installed in assembly 80, assigned to the subscriber of telephone set 20 in exchange 30. According to the embodiment illustrated in FIG. 2, security device 60, 70 can also be installed in additional device 100. The procedures described below occur basically in the same way in both cases.

Let us also assume that the subscriber-side identification carrier 50 and the exchange-side identification carrier 70 have the same ID, i.e., the identity of the subscriber of telephone set 20. In addition, subscriber-side security device 40, 50 and exchange-side security device 60, 70 have the same cryptographic key associated with the subscriber of telephone set 20. Both identification carriers 50, 70 are smart cards.

After security device 40, 50 has authenticated the subscriber of telephone set 20 to exchange 30 connected to security device 60, 70 installed in subscriber-specific assembly 80—the authentication can be performed by separate authentication devices—all connection establishment and service information is encoded by the subscriber-side security device 40, 50 with the subscriber-specific key and transmitted to security device 60, 70 in the subscriber-specific assembly in the D channel via the ISDN network. Security device 60, 70 in exchange 30 decodes the received encoded connection establishment and/or service information with the common subscriber-specific key and sends the decoded information via the D channel handler to a central unit in exchange 30. In response to the decoded connection establishment information, the desired connection to the subscriber dialed is established and, in response to the decoded service information the requested services are made available. This ensures that an unauthorized intruder will not be able to establish a connection at the expense of the owner of the connection of telephone set 20. Different known encoding procedures can be used for encoding and decoding, such as, for example, the Rivest-Shamir-Adlerman method or the Data Encryption Standard method.

Let us now assume that instead of the smart card, a special encoding and decoding module 70 is installed in subscriber-specific assembly 80. Prior to encoding the confidential connection establishment and service information and transmitting it via the ISDN network to exchange 30, decoding module 70 is provided with the key assigned to the subscriber of telephone set 20 by a central or decentralized encryption center. The key can be transmitted to security device 60, 70 via a data medium, such as a diskette, or by electronic data transmission. Important and known security aspects must be taken into account, especially in confidential and authenticated information transmission, so the subscriber-specific key does not become known to unauthorized third parties. After security device 60, 70 of assembly 80 has received the subscriber-specific cryptographic key, the confidential connection establishment and service information is transmitted as described above.

An advantageous refinement of the invention provides that the control channel (D channel) of the digital communication network serves as a data transmission line for user-to-user transmission, specifically between data terminal 20 and exchange 30. In this case the subscriber-side security device 40, 50 is capable of encoding, for example, data transmitted by a personal computer and transmitting it to security device 60, 70 of exchange 30. Security device 60, 70, which can be installed in subscriber-specific assembly 80 or in additional device 100, can decode this data information and transmit it in conjunction with exchange 30, for example, via the Datex P network to the subscriber dialed.

What is claimed is:

1. A method for the transmission of confidential connection establishment and/or service information between subscriber-side data terminals and at least one digital exchange of a digital communication network, the connection establishment and/or service information being useable by the digital exchange for establishing a connection with the subscriber and/or making a requested service available, the network having at least one subscriber-side network terminator for connecting at least one data terminal, with at least one first security device arranged at a subscriber, and at least one second security device assigned to the exchange, the method comprising the steps of:

encoding and/or decoding the connection establishment and/or service information using the first security device;

transmitting the encoded connection establishment and/or service information between the first security device and the second security device over a separate control channel of the digital communication network;

encoding and/or decoding the connection establishment and/or service information by the second security device; and establishing, using the digital exchange in response to the decoded connection establishment and/or service information the connection with the subscriber and/or making the requested service available.

2. The method as recited in claim 1 further comprising transmitting the connection establishment and/or service information decoded by the at least one second security device to a central unit of the exchange.

3. The method as recited in claim 1 wherein the connection establishment and/or service information is encoded and/or decoded with the same subscriber-specific key by the first security device and the second security device.

4. The method as recited in claim 1 further comprising the step of performing an authentication between the subscriber and the exchange by the first security device and the second security device or by separate authentication devices prior to the transmitting step.

5. The method as recited in claim 1 wherein the separate control channel is a D channel of an ISDN network.

6. The method of claim 1, wherein the connection establishment and/or service information is not useful data.

7. A device for transmission of confidential and authentic connection establishment and/or service information between subscriber-side data terminals and at least one exchange of a digital communication network, the connection establishment and/or service information being useable by the digital exchange for establishing a connection with the subscriber and/or making a requested service available, the network having at least one subscriber-side network terminator for connecting at least one data terminal, the device for transmission comprising:

- at least one subscriber-side first security device arranged at a subscriber; and
- at least one second security device arranged in the exchange, with the first security device and second security devices for encoding and/or decoding and exchanging connection establishment and/or service information of the subscriber via a separate control channel of the digital communication network,
- wherein the at least one second security device is installed in an assembly separate from the at least one subscriber-side first security device arranged at the subscriber.

8. The device for transmission as recited in claim 7 wherein the exchange has a plurality of assemblies assigned to certain subscribers, and wherein the second security device is arranged within at least one of the plurality of assemblies.

9. The device for transmission as recited in claim 7 wherein each of the first security devices and second security devices has at least one security module for receiving an identification carrier.

10. The device for transmission as recited in claim 9 wherein the identification carrier is a smart card or a software module capable of encoding and/or decoding the connection establishment and/or service information.

11. The device for transmission as recited in claim 7 wherein the first security device is arranged in the network terminator.

12. The device for transmission as recited in claim 7 wherein the first security device is arranged in each data terminal connected to the network terminator.

13. The device for transmission as recited in claim 7 wherein the first security device is arranged between each data terminal and the network terminator.

14. The device for transmission as recited in claim 7 wherein the digital communication network is an ISDN network and the separate control channel is a D channel of the ISDN network.

15. The device for transmission as recited in claim 7 wherein the first security device and the second security device assigned to the subscriber have a same subscriber-specific ID and can encode and/or decode confidential information with a same subscriber-specific key.

16. The device for transmission as recited in claim 7 wherein the first security device and the second security device assigned to the subscriber can encode and/or decode all data to be transmitted over the control channel of the digital communication network.

17. A device for transmission of confidential connection establishment and/or service information between subscriber-side data terminals at least one exchange of a digital communication network, the connection establishment and/or service information being useable by the digital exchange for establishing a connection with the subscriber and/or making a requested service available the network having at least one subscriber-side network terminator for connecting at least one data terminal, the device for transmission comprising:

- a first security device arranged at least one subscriber; and
- an additional device having a second security device connected upstream from the exchange, with the first security device and second security device capable of encoding and/or decoding and exchanging connection establishment and/or service information of the at least one subscriber via a separate control channel of the digital communication network, wherein the exchange in response to the decoded connection establishment and/or service information, establishes the connection with the subscriber and/or makes the requested service available.

* * * * *